May 18, 1971     M. M. CRANE     3,579,306

DIAGNOSTIC TEST DEVICE

Filed Jan. 22, 1969

INVENTOR
MARGARET M. CRANE

BY *Hugo E. Weisberger*

ATTORNEY

United States Patent Office 3,579,306
Patented May 18, 1971

3,579,306
DIAGNOSTIC TEST DEVICE
Margaret M. Crane, New York, N.Y., assignor to
Organon, Inc., West Orange, N.J.
Filed Jan. 22, 1969, Ser. No. 792,936
Int. Cl. A45c *11/00;* G01n *21/06, 33/16*
U.S. Cl. 23—253                10 Claims

ABSTRACT OF THE DISCLOSURE

A test kit for the performance of analytical and diagnostic determinations involving visual indication of test results comprises a transparent container having a closure utilizable as a sampling device, a platform supported within the container and having an integral upwardly extending tube supporting a test vial for holding test reagents, and a downwardly extending integral tube guiding and supporting a test dropper, and a mirror set at an angle located in the bottom portion of the container to reflect the results of a test performed within the test vial through the container wall so as to be viewable outside the container.

BACKGROUND OF THE INVENTION

Many analytical and diagnostic tests involve the interaction of a sample of liquid to be tested with a reagent, resulting in the formation of precipitate or a sedimentation pattern in the test vessel, thus providing a qualitative indication of the presence or absence of a particular chemical or biological factor. In the fields of immunology and diagnosis, the objective may be the determination of the presence or absence of antigens or antibodies in body fluids as an aid in the detection of certain physiological or pathological conditions in humans and animals. Depending upon the particular combination of reagents and test liquid employed, the reaction may result in the formation of a precipitate, in which case it is known as a precipitin reaction. Where the reaction is between substances distributed in a liquid medium, at least one of which substances being a solid which becomes aggromerated, the reaction is known as an agglutination reaction. The formation of the precipitate, or the agglutination or inhibition of agglutination of specially-treated particles is manifested visually in the way the precipitate forms, or the particles arrange themselves following reaction.

Immunological determinations, such as, for example, tests for pregnancy, are customarily performed in clinical laboratories, or in the offices of physicians, with a suspension of an antigen in a liquid medium, and a solution of suitable antiserum, dispensed into a test vial, together with a sample of the body fluid to be tested. The use of droppers for dispensing of reagents in this manner may result in questionable findings because of limitations in the accuracy of ordinary droppers. Such droppers are usually uncalibrated, and although the accuracy of drop size is of great importance in the test, necessary accuracy is seldom attained.

There have recently become available immunological test reagents in the form of dry solid pellets or tablets, which are stable, accurate in unit content of reagent, and which are completely non-reactive until they are contacted by the liquid to be tested. Similar solid forms of reagents for chemical analyses are available for qualitative test purposes. These pellets or tablets retain all the properties essential for the performance of their respective tests, and need only to be moistened with the liquid to be tested, to give rise to a precipitate, or agglomerate, or inhibition of agglutination, or color appearance, which marks the test in question.

GENERAL DESCRIPTION OF THE INVENTION

In accordance with the present invention there is provided a novel test device or kit for the performance of analytical and diagnostic determinations, which provides a visual indication of the test results, and which utilizes dry, solid test reagents in the form of pellets, tablets, granules or powders.

A principal object of the invention is to provide a test kit which comprises a unitized diagnostic assembly presenting in a single container all the elements required for performance of a diagnostic or analytical test.

Another object is to provide a transparent container within which a diagnostic test may be performed so that the test results are viewable through the container wall to an outside viewer.

Another object is to provide a test kit which is inexpensive and which may be utilized for a single test and thereafter disposed of.

Another object is to provide a test kit which is especially adapted for the performance of a pregnancy test, utilizing known immunochemical laboratory reagents in solid form included in the kit, together with necessary auxiliary manipulative units.

Still another object is to provide a pregnancy test kit by means of which a woman can perform a test for the hormone of pregnancy within the privacy of her own home.

These and other objects will be come apparent as the description proceeds in the following part of the specification wherein the details of construction of a presently preferred embodiment are set forth, together with the accompanying drawings.

While the device of the invention will be described with particular reference to its utility in the performance of a pregnancy test, it will be understood that such description is for purpose of illustration only, and that the test device is capable of use for a wide variety of analytical and diagnostic tests which are characterized by the production of visually observable tests results.

The test kit of the present invention is particularly adapted for the performance of an in vitro type pregnancy determination indicative of the presence or absence of the hormone of pregnancy in the urine of the woman being tested. In this test there are utilized two principal reagents. The first is a dry stable solid pellet or tablet containing a predetermined quantity of erythrocytes pretreated with a tanning agent or mordant and sensitized with human chorionic gonadotropin (HCG). The second reagent is a dry stable solid pellet or tablet containing a predetermined quantity of a homologous human chorionic gonadotropin antiserum sufficient to react with said erythrocytes and a certain amount of human chorionic gonadotropin. Desirably there is also present a buffer reagent also in the form of a dry pellet or tablet.

The test is performed by allowing a sample of urine to remain in contact with these reagents for a sufficient period of time to yield a visual indication of agglutination or inhibition of agglutination. If there is HCG present in the urine being tested, which is one of the criteria of pregnancy, the reaction of the erythrocytes with the homologous antiserum is prevented, causing formation of a specific sedimentation pattern on the bottom of the vial in which the test is performed.

The novel features and operation of a presently preferred embodiment of the test device of the present invention will be better understood by reference to the accompanying drawings, in which.

Figure 1:
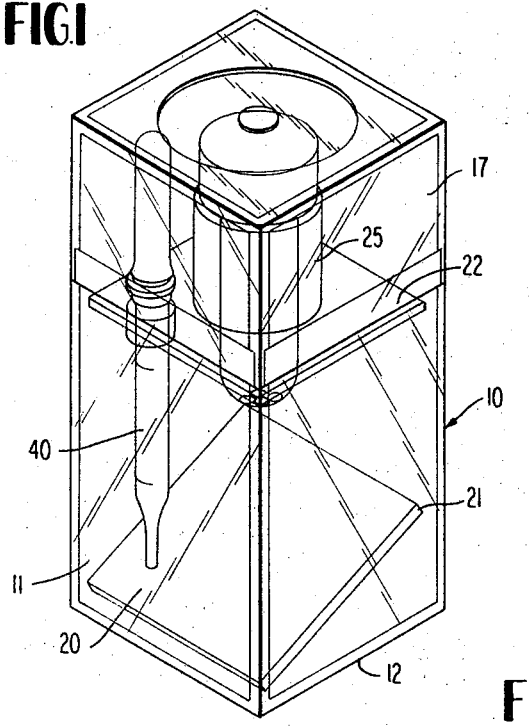
FIG. 1 is a view in perspective, showing the various elements of the device in assembly.
Figure 2:
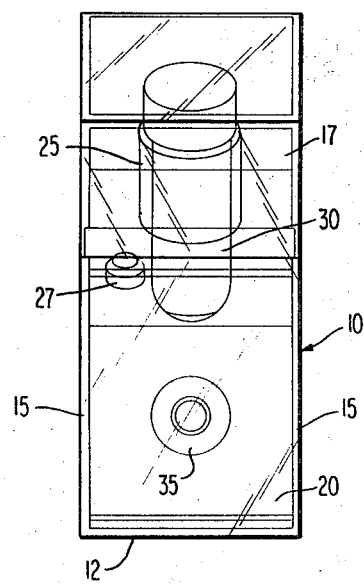
FIG. 2 is a front view, inclined slightly forward, showing the test results as observed by a viewer through the container wall.
Figure 3:
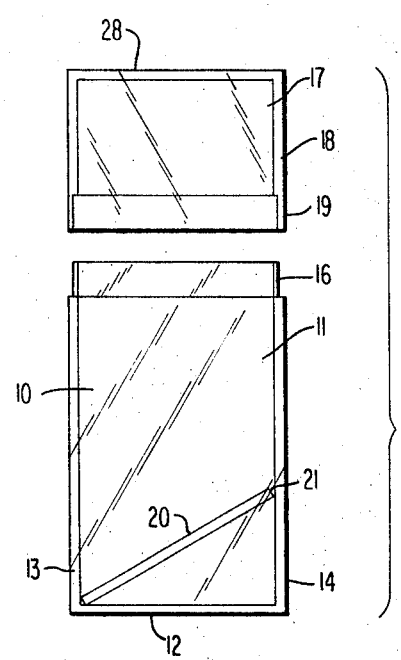
FIG. 3 is a side elevation of the container body and cover member separated from each other.
Figure 6:
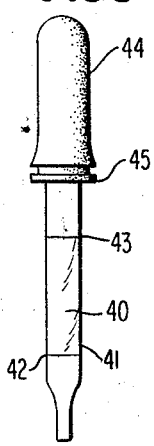
FIG. 6 shows the dropper member with level markings.
Figure 5:
FIG. 5 shows the test vial and its removale cap separated from each other.

Referrings now to FIG. 1, there is depicted therein the unitized test assembly, constituting a completely self-contained kit, requiring no additional outside equipment for performance of a diagnostic test. The kit comprises a transparent container or receptacle 10, which may be of any desired cross-sectional form, and in the embodiment shown is substantially square in cross-section, e.g. about 1½ inches square. The container comprises a body member 11, having a bottom wall 12, a front wall 13, a rear wall 14, and side walls 15, all upstanding about the margin of the bottom wall 12, as shown in FIGS. 2 and 3. The container body is provided with an integral extension member 16 which serves to receive the cover member 17 with a friction fit. Cover member 17 has substantially the same cross-sectional dimensions as the container body 10. Both the cover and container body may be made of transparent plastic material, such as, for example, methyl methacrylate, for resistance to breakage and light weight. Cover 17 has a top wall 28, and side walls 18 terminating in an integral flange 19, adapted to engage extension member 16 of the container body with a friction fit. The side walls 18 are of sufficient depth to enable the cover member 17 to be used as a means for collecting a urine sample, advantageously about 1 inch deep. The cover itself may be, for example, about 1½ inches square.

There is positioned in the bottom portion of container body 10 a mirror 20, preferably having a plane surface. Mirror 20 is disposed with one edge resting on the bottom adjacent to front wall 13, and extending diagonally across the container with its upper edge 21 spaced from the bottom 12 and resting against rear wall 14. To permit viewing of test results reflected from the bottom of test vial 30 through the front wall 13 by an observer, the mirror is advantageously set at an angle of about 30° to the horizontal.

Figure 4:
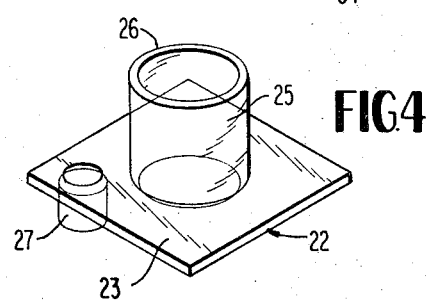
FIG. 4 is a view in perspective of the platform member.

Positioned within container 10, and supported on the side walls of container 10 is a platform 22, having dimensions substantially co-extensive with the cross-sectional dimensions of the interior of container body 10. Platform 22, shown in detail in FIG. 4, has a table portion 23, which is in a horizontal position and is fastened to side walls 15 either by integral welding, or by a suitable adhesive, or by being snapped into place with its edges extending into slots or grooves (not shown) in side walls 15, in the manner generally illustrated in FIG. 1. Platform 22 is provided with a centrally disposed, intergral upwardly extending tube member 25, terminating in a horizontal flat edge 26, which serves to guide and support test vial 30. Platform 22 is also provided with integral downwardly extending tube member 27, located near the platform edge which is adjacent to container front wall 13, and which serves to guide and support dropper member 40.

Test vial 30, which may be made of glass or plastic material, has a threaded neck 31, adapted to receive an internally threaded screw type closure cap 32. The cap is of sufficient width so that its lower edge 33 will rest upon the upper edge 26 of tube member 25, so as to support the vial and its attached cap. The test vial has an outside diameter adapted to fit snugly in the interior of tube 25. When the kit is ready for use, there are incorporated in test vial 30, one or more test reagents 34, in dry pellet or tablet form.

Dropper member 40 includes a glass or plastic body 41, which is provided with circumferential markings 42 and 43, to indicate levels to which the liquid dropper is to be filled with test amounts of urine and water, and which has an outside diameter adapted to fit snugly into the interior of supporting tube 27. The liquid dropper has rubber section bulb 44 which has a flange 45 at its lower end or width greater than tube 27, thereby serving to support the dropper on platform 22. The rubber bulb fits over the upper end body 41 in conventional manner.

FIG. 2 shows the test kit as viewed by an observer, with the test results obtained in the bottom of test vial 30 as a reflecterd image 35 in mirror 20.

The manner of using the test kit of the invention will be apparent from the following description of a test for the hormone of pregnancy, i.e. human chorionic gonadotropin. The person making the test, whether physician, clinician, or woman user, first removes cover member 17 turns it upward and collects a sample of urine therein. The test vial 30 which contains the necessary test reagents, namely pellets of erythrocyte antigen, HCG antiserum, and buffer substance, is opened by unscrewing cap 32. The dropper 40 is filled to its lower mark with urine from the cover, and this urine is transferred to the test vial. The dropper is then filled with water to its upper mark, and this quantity of water is then transferred to the test vial. The cap is then screwed back onto the test vial, and the vial and its contents are shaken up and down for 30 seconds. The closed test vial is then placed in the container body 10 in upright position, supported in tube 25. The cover is not put back on container 10, and the latter is allowed to rest upon a flat horizontal surface, free from jarring or vibration, and at room temperature, for a period of two hours. Without moving the container and test vial, the results of the tests are viewable in the reflection of the bottom of the test vial in mirror 20. If an even, brown, doughnut shape of sediment is formed, the results are taken as a positive indication of possible pregnancy, subject to confirmation by other tests. Formation of an even, yellow-brown coloration indicates that the hormone HCG is not present in sufficient amount to indicate pregnancy at the time of the test.

While the particular test kit herein shown and disclosed in detail is fully capable of attaining the objects and of providing the advantages stated, it is to be understood that it is merely illustrative of the presently preferred embodiment of the invention, which can be utilized for other diagnostic and analytical tests, and that no limitations are intended to the details of construction and design other than as defined in the appended claims.

What is claimed is:

1. A test kit for performing diagnostic and analytical determinations involving visual indication of test results, comprising, in combination, a transparent container having a bottom wall, and upstanding side walls about the margin of said bottom wall, a cover for said container, an inclined mirror positioned in the bottom portion of the container, a transparent test vial adapted to receive test reagents and samples, and a transparent platform supporting said test vial with the vial bottom spaced above said mirror, whereby the test results in the vial bottom are reflected through the container wall so as to be viewable outside said container.

2. A test kit for performing diagnostic and analytical determinations within said kit, said determinations involving visual indication of test results, comprising, in combination, a transparent container having a bottom wall, and upstanding front, rear, and side walls about the margin of said bottom wall, a transparent cover adapted to close said container with a friction fit, an inclined mirror positioned in the bottom portion of said container with one edge resting on the bottom adjacent to said front wall, and extending diagonally across the container with its upper edge spaced from the bottom and resting against said rear wall, a transparent test vial adapted to receive test reagents and samples, a liquid dropper having at least one circumferential level marking thereon, and a transparent platform supporting said test vial with the vial bottom spaced above said mirror, and also supporting said dropper, whereby the results of a test performed in the vial are reflected through the container so as to be viewable outside said container.

3. The test kit of claim 2 in which said test vial contains at least one test reagent in dry pellet or tablet form.

4. The test kit of claim 2 in which said container cover has a set of side walls about the margin of its top wall of sufficient depth to enable the cover, when inverted, to serve as a sample-collecting means.

5. The test kit of claim 2 in which said platform is supported on the side walls of said container and has dimensions substantially co-extensive with the cross-sectional dimensions of the interior of said container.

6. The test kit of claim 5 in which said platform has a table portion which is in a horizontal position and is integrally attached to said side walls.

7. The test kit of claim 5 in which said platform is provided with a centrally disposed integral upwardly extending tube which serves to support and guide said test vial.

8. The test kit of claim 5 in which said platform is provided with an integral downwardly extending tube which serves to support and guide said liquid dropper.

9. The test kit of claim 5 in which said test vial has a threaded neck and is provided with a screw cap of sufficient width to engage the top of said upwardly extending tube so as to be supported thereby.

10. A unitary kit for testing for the hormone of pregnancy, comprising, in combination, a transparent container having a bottom wall and upstanding front, rear, and side walls about the margin of said bottom wall, a transparent cover adapted to close said container with a friction fit and having side walls of sufficient depth to enable said cover to receive a sample of urine when the cover is removed and inverted, an inclined plane mirror positioned in the bottom portion of said container with one edge resting on the bottom adjacent to said front wall, and extending diagonally across the container with its upper edge spaced from the bottom and resting against said rear wall, a transparent test vial containing a solid pellet of erythrocytes sensitized with human chorionic gonadotropin and a solid pellet of human chorionic gonadotropin antiserum and a solid pellet of a buffer, a liquid dropper having two spaced circumferential level markings thereon, and a transparent platform supporting said test vial with the vial bottom spaced above said mirror and also supporting said dropper, whereby the results of a test performed within said container by adding said urine to said test vial are reflected through the front wall of the container so as to be viewable outside the container.

References Cited
UNITED STATES PATENTS

| | | | |
|---|---|---|---|
| 2,007,087 | 7/1935 | Hird | 356—246 |
| 3,272,319 | 9/1966 | Brewer | 206—12 |

MORRIS O. WOLK, Primary Examiner

R. M. REESE, Assistant Examiner

U.S. Cl. X.R.

23—230, 259; 128—2; 206—12; 356—36, 244, 246; 424—12